United States Patent
Hong et al.

(10) Patent No.: US 12,522,810 B2
(45) Date of Patent: Jan. 13, 2026

(54) TRANSAMINASE MUTANT AND USE THEREOF

(71) Applicant: ASYMCHEM LABORATORIES (TIANJIN) CO., LTD., Tianjin (CN)

(72) Inventors: Hao Hong, Morrisville, NC (US); Gage James, Morrisville, NC (US); Yi Xiao, Tianjin (CN); Na Zhang, Tianjin (CN); Xuecheng Jiao, Tianjin (CN); Yulei Ma, Tianjin (CN); Huiyan Mu, Tianjin (CN); Shan Cao, Tianjin (CN)

(73) Assignee: Asymchem Laboratories (Tianjin) Co., Ltd., Tianjin (CN)

( * ) Notice: Subject to any disclaimer, the term of this patent is extended or adjusted under 35 U.S.C. 154(b) by 429 days.

(21) Appl. No.: 17/997,419

(22) PCT Filed: May 29, 2020

(86) PCT No.: PCT/CN2020/093528
§ 371 (c)(1),
(2) Date: Oct. 28, 2022

(87) PCT Pub. No.: WO2021/217773
PCT Pub. Date: Nov. 4, 2021

(65) Prior Publication Data
US 2023/0235300 A1     Jul. 27, 2023

(30) Foreign Application Priority Data
Apr. 29, 2020   (CN) .......................... 202010353069.8

(51) Int. Cl.
| C12N 9/10 | (2006.01) |
| C12N 15/52 | (2006.01) |
| C12N 15/70 | (2006.01) |
| C12P 13/00 | (2006.01) |

(52) U.S. Cl.
CPC ........... *C12N 9/1096* (2013.01); *C12N 15/52* (2013.01); *C12N 15/70* (2013.01); *C12P 13/001* (2013.01); *C12Y 206/01* (2013.01)

(58) Field of Classification Search
CPC ...... C12N 9/1096; C12N 15/52; C12N 15/70; C12P 13/001; C12P 13/008; C12P 17/12; C12Y 206/01; C12R 2001/01
See application file for complete search history.

(56) References Cited

FOREIGN PATENT DOCUMENTS

| CN | 104328093 A | 2/2015 | |
| CN | 107805648 A | 3/2018 | |
| CN | 107828751 A | * 3/2018 | ............. C12N 15/63 |
| CN | 108048419 A | 5/2018 | |
| CN | 108823179 A | 11/2018 | |
| WO | 2019011236 A1 | 1/2019 | |
| WO | 2019084950 A1 | 5/2019 | |
| WO | 2019096973 A1 | 5/2019 | |

OTHER PUBLICATIONS

CN107828751, Hao. English Translation Obtained from Google Patents on Dec. 5, 2024. (Year: 2024).*
Hong H, et al. CN-107828751-A English Translation Obtained from Google Patents on Mar. 27, 2025. (Year: 2018).*
UniProt, "Accession No. A0A1W9YNX3", 2017; Retrieved on Mar. 26, 2024: https://www.uniprot.org/uniprotkb/A0A1W9YNX3/entry.
Patil et al., "Recent Advances in ω-Transaminase-Mediated Biocatalysis for the Enantioselective Synthesis of Chiral Amines", Catalysts, 2018, pp. 1-25, 8(7).
UniProt, "Accession No. A0A318LFW8", 2018; Retrieved on Mar. 26, 2024: https://www.uniprot.org/uniprotkb/A0A318LFW8/entry.
Tang et al., "Efficient biosynthesis of (R)-3-amino-1-butanol by a novel (R)-selective transaminase from *Actinobacteria* sp", Journal of Biotechnology, 2019, pp. 49-54, 295.
International Search Report for corresponding PCT/CN2020/093528 mailed Feb. 3, 2021; 4 pages.

* cited by examiner

*Primary Examiner* — Nghi V Nguyen
*Assistant Examiner* — Natalie Iannuzo
(74) *Attorney, Agent, or Firm* — Armstrong Teasdale LLP

(57) ABSTRACT

Provided are a transaminase mutant and an application thereof. Compared with an amino acid sequence shown in SEQ ID NO:1, an amino acid sequence of the transaminase mutant includes at least one of the following mutation sites: L166, K149, K146, A168, H73, F133, H82, E24, V194, T294, A295, G235 and F236. The mutant of the present invention has the improved catalytic activity for a transammonization reaction of ketone substrates, and is suitable for industrial production of chiral amines.

6 Claims, No Drawings
Specification includes a Sequence Listing.

SEQUENCE LISTING

```
<160> NUMBER OF SEQ ID NOS: 1

<210> SEQ ID NO 1
<211> LENGTH: 341
<212> TYPE: PRT
<213> ORGANISM: Actinobacteria sp.

<400> SEQUENCE: 1

Met Thr Ile Ser Lys Asp Ile Asp Tyr Ser Thr Ser Asn Leu Val Ser
1               5                   10                  15

Val Ala Pro Gly Ala Ile Arg Glu Pro Thr Pro Ala Gly Ser Val Ile
            20                  25                  30

Gln Tyr Ser Asp Tyr Glu Leu Asp Glu Ser Ser Pro Phe Ala Gly Gly
        35                  40                  45

Ala Ala Trp Ile Glu Gly Glu Tyr Val Pro Ala Ala Glu Ala Arg Ile
    50                  55                  60

Ser Leu Phe Asp Thr Gly Phe Gly His Ser Asp Leu Thr Tyr Thr Val
65                  70                  75                  80

Ala His Val Trp His Gly Asn Ile Phe Arg Leu Lys Asp His Ile Asp
                85                  90                  95

Arg Val Phe Asp Gly Ala Gln Lys Leu Arg Ile Gln Ser Pro Leu Thr
            100                 105                 110

Lys Ala Glu Val Glu Asp Ile Thr Lys Arg Cys Val Ser Leu Ser Gln
        115                 120                 125

Leu Arg Glu Ser Phe Val Asn Ile Thr Ile Thr Arg Gly Tyr Gly Ala
    130                 135                 140
```

```
Arg Lys Gly Glu Lys Asp Leu Ser Lys Leu Thr Ser Gln Ile Tyr Ile
145                 150                 155                 160

Tyr Ala Ile Pro Tyr Leu Trp Ala Phe Pro Pro Glu Glu Gln Ile Phe
                165                 170                 175

Gly Thr Ser Ala Ile Val Pro Arg His Val Arg Arg Ala Gly Arg Asn
            180                 185                 190

Thr Val Asp Pro Thr Val Lys Asn Tyr Gln Trp Gly Asp Leu Thr Ala
        195                 200                 205

Ala Ser Phe Glu Ala Lys Asp Arg Gly Ala Arg Thr Ala Ile Leu Leu
    210                 215                 220

Asp Ala Asp Asn Cys Val Ala Glu Gly Pro Gly Phe Asn Val Val Met
225                 230                 235                 240

Val Lys Asp Gly Lys Leu Ser Ser Pro Ser Arg Asn Ala Leu Pro Gly
                245                 250                 255

Ile Thr Arg Leu Thr Val Met Glu Met Ala Asp Glu Met Gly Ile Glu
            260                 265                 270

Phe Thr Leu Arg Asp Ile Thr Ser Arg Glu Leu Tyr Glu Ala Asp Glu
        275                 280                 285

Leu Ile Ala Val Thr Thr Ala Gly Gly Ile Thr Pro Ile Thr Ser Leu
    290                 295                 300

Asp Gly Glu Pro Leu Gly Asp Gly Thr Pro Gly Pro Val Thr Val Ala
305                 310                 315                 320

Ile Arg Asp Arg Phe Trp Ala Met Met Asp Glu Pro Ser Ser Leu Val
                325                 330                 335

Glu Ala Ile Glu Tyr
            340
```

TRANSAMINASE MUTANT AND USE THEREOF

CROSS-REFERENCE TO RELATED APPLICATIONS

This application is a national phase application filed under 35 U.S.C. § 371 claiming benefit to International Patent Application No. PCT/CN2020/093528, filed May 29, 2020, which claims the benefit of priority from Chinese Patent Application No. 202010353069.8, filed on Apr. 29, 2020, each of which are hereby incorporated by reference in their entirety herein.

SEQUENCE LISTING

The instant application contains a sequence listing which is submitted electronically in ST.25 format and is hereby incorporated by reference in its entirety. Said ST.25 copy is named 37534-99ascii_ST25.txt and is 3,293 bytes in size.

TECHNICAL FIELD

The present invention relates to the field of enzyme production, in particular to a transaminase mutant and use thereof.

BACKGROUND

Chiral amines are structural units of many important bioactive molecules, and key intermediates for synthesizing many chiral drugs. Many important neurological drugs, cardiovascular drugs, antihypertensive drugs, anti-infective drugs and the like are synthesized by using the chiral amines as the intermediates. The preparation of the chiral amines is mainly achieved by a method of chemical reduction, and it has disadvantages such as harsh reaction conditions, using of toxic transition-state metal catalysts, and low product stereoselectivity in reactions. At present, the using of bio-catalysis to prepare chiral compounds in the pharmaceutical industry is widely applied, and has a broad prospect.

A ω-transaminase may catalyze ketone substrates, to efficiently prepare the chiral amines by stereoselective transamination. Due to its advantages of high selectivity, high conversion rate and mild reaction conditions and the like, it receives extensive attentions from researchers. However, in industrial applications, most of wild transaminases have disadvantages of low catalytic efficiency, poor stereoselectivity and weak stability and the like, so that there are not many transaminases that may really be used.

The invention patent application of which the application publication number is CN107828751A discloses a ω-transaminase mutant L107I derived from *Actinobacteria* sp., the mutant may catalyze acetophenone compounds with high selectivity to obtain chiral ammonia products, and a reaction is as follows:

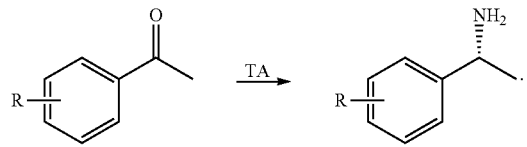

R = H, F, Cl, Br, $CH_3$, $OCH_3$, $NO_2$

However, its initial activity is less than 10%, the activity is low, the amount of an enzyme added during the reaction is large, and the post-treatment is difficult.

SUMMARY

A main purpose of the present invention is to provide a transaminase mutant and an application thereof, as to solve a problem that an existing transaminase is not suitable for industrial production.

In order to achieve the above purpose, according to an aspect of the present invention, a transaminase mutant is provided. Compared with an amino acid sequence of SEQ ID NO:1, an amino acid sequence of the transaminase mutant includes at least one of the mutated sites selected from the group consisting of: L166, K149, K146, A168, H73, F133, H82, E24, V194, T294, A295, G235 and F236.

Further, the amino acid sequence of the transaminase mutant includes one or more of mutated sites selected from the group consisting of: L166I/V, K149Q/V/C/I/W/M/Y/H/L/F/R, K146R/M/A/P, A168M/V/I/S/P/F, H73T/N/C/Q/R/W/M/K/S, F133S/Q/M/R/A/D, H82S\Q\E\T\Y, E24V/S/A/F, V194I/S/A/H/N, T294Q/W/V/A/E/R/Y/F, A295S/Y/I/M/G, G235Y/H and F236I/T/P/M/V/D/S, Y9N, S132K, R145K/P/S/M/Y, L151R/M/A, and T178M, "/" represents "or"; or the transaminase mutant includes the one or more of mutated sites, and the amino acid sequence of the transaminase mutant has more than 80%, preferably more than 90%, further more preferably, more than 95% identity with the transaminase mutant with the one or more of mutated sites.

Further, the amino acid sequence of the transaminase mutant comprises one of the following mutation combinations as shown in the following table:

| | |
|---|---|
| L166I + A168I | L166I + K146R + F133M |
| L166I + A168V | L166I + K146R + F133Q |
| L166I + A168M | L166I + K146R + F133D |
| L166I + K149V | L166I + K149Y + A168I + H73N |
| L166I + K149C | L166I + K146R + A168I + K149H |
| L166V + A168M | L166I + K146R + A168I + K149L |
| L166V + A168I | L166I + K146R + A168I + K149I |
| L166V + A168V | L166I + K146R + A168I + K149V |
| L166V + K149V | L166I + K146R + A168I + K149F |
| L166V + K149C | L166I + K146R + A168I + K149M |
| L166I + F133S + K149Q | L166I + K146R + A168I + K149Y |
| L166I + F133S | L166I + K146R + A168I + H73T |
| L166I + K146R | L166I + K146R + A168I + H73S |
| L166I + K146M | L166I + K146R + A168I + H73N |
| L166I + K146A | L166I + K146R + A168I + H73M |
| L166I + K146R + A168I | L166I + K146R + A168I + H73Q |
| L166I + K146R + A168S | L166I + K146R + A168I + K149H |
| L166I + K146R + A168P | L166I + K146R + A168I + K149H + R145K |

-continued

| | |
|---|---|
| L166I + K146R + A168F | L166I + K146R + A168I + K149H + R145S |
| L166I + A168I + K149H | L166I + K146R + A168I + K149H + R145M |
| L166I + A168I + K149Y | L166I + K146R + A168I + K149H + R145P |
| L166I + A168I + H73N | L166I + K146R + A168I + K149H + R145Y |
| L166I + A168I + K149H + R145K | L166I + K146R + A168I + K149H + R145K + T294A |
| L166I + A168I + K149H + K146P | L166I + K146R + A168I + K149H + R145K + T294E |
| L166I + K146R + F133S | L166I + K146R + A168I + K149H + R145K + T294R |
| L166I + K146R + F133R | L166I + K146R + A168I + K149H + R145K + T294Y |
| L166I + K146R + F133A | L166I + K146R + A168I + K149H + R145K + T294F |
| L166I + K146R + F133S + K149Q | |
| L166I + K146R + F133S + K149R | |
| L166I + K146R + F133S + K149L | |
| L166I + K146R + F133S + K149M | |
| L166I + K146R + F133S + K149Y | |
| L166I + K146R + F133S + K149Q + H73R | |
| L166I + K146R + F133S + K149Q + H73Q | |
| L166I + K146R + F133S + K149Q + H73K | |
| L166I + K146R + F133S + K149Q + H73T | |
| L166I + K146R + F133S + K149Q + H73S | |
| L166I + K146R + F133S + K149Q + H73W | |
| L166I + K146R + F133S + K149Q + H73R + V194I | |
| L166I + K146R + F133S + K149Q + H73R + V194S | |
| L166I + K146R + F133S + K149Q + H73R + V194A | |
| L166I + K146R + F133S + K149Q + H73R + V194H | |
| L166I + K146R + F133S + K149Q + H73R + V194N | |
| L166I + K146R + F133S + K149Q + H73R + V194I + H82S | |
| L166I + K146R + F133S + K149Q + H73R + V194I + H82Q | |
| L166I + K146R + F133S + K149Q + H73R + V194I + H82E | |
| L166I + K146R + F133S + K149Q + H73R + V194I + H82T | |
| L166I + K146R + F133S + K149Q + H73R + V194I + H82Y | |
| L166I + K146R + F133S + K149Q + H73R + V194I + E24V | |
| L166I + K146R + F133S + K149Q + H73R + V194I + E24S | |
| L166I + K146R + F133S + K149Q + H73R + V194I + E24A | |
| L166I + K146R + F133S + K149Q + H73R + V194I + E24F | |
| L166I + K146R + F133S + K149Q + H73R + V194I + L151R | |
| L166I + K146R + F133S + K149Q + H73R + V194I + L151M | |
| L166I + K146R + F133S + K149Q + H73R + V194I + L151A | |
| L166I + K146R + F133S + K149Q + H73R + V194I + E24V + A295S | |
| L166I + K146R + F133S + K149Q + H73R + V194I + E24V + A295Y | |
| L166I + K146R + F133S + K149Q + H73R + V194I + E24V + A295I | |
| L166I + K146R + F133S + K149Q + H73R + V194I + E24V + A295M | |
| L166I + K146R + F133S + K149Q + H73R + V194I + E24V + A295G | |
| L166I + K146R + F133S + K149Q + H73R + V194I + E24V + T294A | |
| L166I + K146R + F133S + K149Q + H73R + V194I + E24V + T294R | |
| L166I + K146R + F133S + K149Q + H73R + V194I + E24V + T294Q | |
| L166I + K146R + F133S + K149Q + H73R + V194I + E24V + T294W | |
| L166I + K146R + F133S + K149Q + H73R + V194I + E24V + T294V | |
| L166I + K146R + F133S + K149Q + H73R + V194I + E24V + G235Y | |
| L166I + K146R + F133S + K149Q + H73R + V194I + E24V + G235H | |
| L166I + K146R + F133S + K149Q + H73R + V194I + E24V + F236I | |
| L166I + K146R + F133S + K149Q + H73R + V194I + E24V + F236T | |
| L166I + K146R + F133S + K149Q + H73R + V194I + E24V + F236P | |
| L166I + K146R + F133S + K149Q + H73R + V194I + E24V + F236M | |
| L166I + K146R + F133S + K149Q + H73R + V194I + E24V + F236V | |
| L166I + K146R + F133S + K149Q + H73R + V194I + E24V + F236D | |
| L166I + K146R + F133S + K149Q + H73R + V194I + E24V + F236S | |
| L166I + K146P + F133S + K149Q + H73R + V194I + H82S | |
| L166I + K146R + F133S + K149Q + H73R + V194I + H82S + Y9N | |
| L166I + K146R + F133S + K149Q + H73R + V194I + H82S + E24V | |
| L166I + K146R + F133S + K149Q + H73R + V194I + H82S + S132K | |
| L166I + K146R + F133S + K149Q + H73R + V194I + H82S + T178M | |
| L166I + K146R + F133S + K149Q + H73R + V194I + H82S + E24A | |
| L166I + K146R + F133S + K149Q + H73R + V194I + H82S + E24V | |

In order to achieve the above purpose, according to a second aspect of the present invention, a deoxyribonucleic acid (DNA) molecule is provided, and the DNA molecule encodes any one of the above transaminase mutants.

In order to achieve the above purpose, according to a third aspect of the present invention, a recombinant plasmid is provided, and the recombinant plasmid is linked with any one of the above DNA molecules.

In order to achieve the above purpose, according to a fourth aspect of the present invention, a host cell is provided, and the host cell contains any one of the above recombinant plasmids.

Further, the host cell is a prokaryotic cell or a eukaryotic cell; preferably the prokaryotic cell is *Escherichia coli*.

In order to achieve the above purpose, according to a fifth aspect of the present invention, a method for producing a chiral amine is provided, and the method comprises: using any one of the above transaminase mutants to catalyze a transamination reaction of a ketone compound of

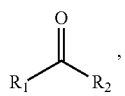

to produce a product of

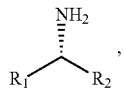

wherein each of $R_1$ and $R_2$ are independently a substituted or unsubstituted alkyl, a substituted or unsubstituted aralkyl, or a substituted or unsubstituted aryl respectively, and $R_1$ and $R_2$ form an unsubstituted or substituted ring independently or in combination with each other.

Further, $R_1$ and $R_2$ are the optionally substituted or unsubstituted alkyl, the optionally substituted or unsubstituted aralkyl, or the optionally substituted or unsubstituted aryl of which the number of carbon atoms is 1-20 (C1-C20); preferably, $R_1$ and $R_2$ are the optionally substituted or unsubstituted alkyl, the optionally substituted or unsubstituted aralkyl, or the optionally substituted or unsubstituted alkyl of which the number of the carbon atoms is 1-10; and preferably, the substitution means that it is substituted by a halogen atom, the nitrogen atom, the sulfur atom, a hydroxyl, a nitro group, a cyano group, a methoxy, an ethoxy, a carboxyl, a carboxymethyl, a carboxyethyl or a methylenedioxy.

Further, the ketone compound is

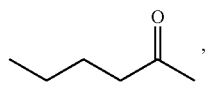

or the ketone compound is an acetophenone compound substituted or unsubstituted at any position of the benzene ring, and the transaminase mutant catalyzes the transamination reaction of

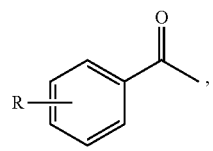

to proform the product

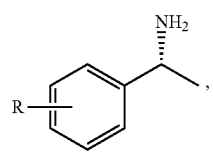

herein R represents any substitutation of a halogen atom, a nitro, a methyl or a methoxyl at any position of the benzene ring; preferably, the halogen is a fluorine atom; more preferably, the fluorine atom is substituted in a meta position of the benzene ring; preferably, the nitro group is substituted in an ortho position of the benzene ring; and preferably, the acetophenone compound is

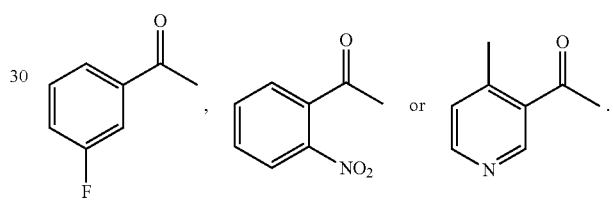

By applying a technical scheme of the present invention, the mutant of the present invention has the improved catalytic activity for the transamination reaction of ketone substrates, and is suitable for industrial production of chiral amines.

DETAILED DESCRIPTION OF THE EMBODIMENTS

It should be noted that embodiments in the present application and features of the embodiments may be combined with each other in the case without conflicting. The present invention is described in detail below with reference to the embodiments.

"Naturally-existing" or "wild-type" as opposed to "mutant" refers to a form found in nature. For example, a naturally-existing or wild-type polypeptide or polynucleotide sequence is a sequence that exists in an organism, and it may be separated from a source in nature, and is not artificially deliberately modified or changed.

In the present application, reference to, for example, a cell, nucleic acid or polypeptide "recombinant", means that it is modified in a mode which is not found in nature, or in the same form as found in nature, but is made from a synthetic material and/or prepared or derived by the use of a recombinant technology, or corresponds to the cell, nucleic acid or polypeptide in its native or inherent form. Herein, a non-restrictive example comprises expressing a gene other than in the inherent (non-recombinant) form in the cell, or expressing an inherent gene at different levels in a recombinant cell.

"Percentage of sequence identity" refers to a comparison between polynucleotide sequences or amino acid sequences, and is determined by comparing two optimally compared sequences across a comparison window, herein the portion of the polynucleotide sequences or amino acid sequences within the comparison window may comprise addition or deletion (namely, a vacancy) compared to a reference sequence for optimal comparison of the two sequences. The percentage may be calculated by as follows: determining the number of positions in the two sequences in which the same nucleic acid base or amino acid residue occurs, to produce the number of matched positions, dividing the number of the matched positions by the total number of positions in the comparison window, and enabling a result to be multiplied by 100, to obtain the percentage of the sequence identity. Optionally, the percentage may be calculated by as follows: determining the number of positions in the two sequences in which the same nucleic acid base or amino acid residue occurs, or a nucleic acid base or amino acid residue is aligned with the vacancy, to produce the number of matched positions. And dividing the number of the matched positions by the total number of positions in the comparison window, and enabling a result to be multiplied by 100, to obtain the percentage of the sequence identity. Herein, the "reference sequence" refers to a specified sequence used as a basis for sequence comparison. The reference sequence may be a subset of a larger sequence, for example, a segment of a full-length gene or polypeptide sequence.

Site-directed mutagenesis: referring to the introduction of required changes (usually changes that represent favorable directions) into a target DNA fragment (either a genome or a plasmid) by methods such as a polymerase chain reaction (PCR), including addition, deletion, and point mutation etc. The site-directed mutagenesis may rapidly and efficiently improve the properties and representation of a target protein expressed by DNA, and is a very useful means in genetic research work.

The directed evolution of enzymes is an irrational design of proteins, artificially creating special evolutionary conditions, simulating natural evolutionary mechanisms, modifying genes in vitro, applying error-prone PCR, DNA shuffling and other technologies, and combining with a high-efficiency screening system, to obtain a new enzyme with expected properties.

In order to improve the enzymatic activity of the transaminase in an existing technology, reduce the usage amount of the enzyme, and reduce the difficulty of post-treatment, the present application is to evolve an ω-transaminase mutant L107I (SEQ ID NO:1) derived from *Actinobacteria* sp. by a method of enzyme evolution.

The sequence of the ω-transaminase mutant L107I (SEQ ID NO:1) derived from *Actinobacteria* sp. is as follows:

MTISKDIDYSTSNLVSVAPGAIREPTPAGSVIQYSDYELDESSPFAGG

AAWIEGEYVPAAEARISLFDTGFGHSDLTYTVAHVWHGNIFRLKDHID

RVFDGAQKLRIQSPLTKAEVEDITKRCVSLSQLRESFVNITITRGYGA

RKGEKDLSKLTSQIYIYAIPYLWAFPPEEQIFGTSAIVPRHVRRAGRN

TVDPTVKNYQWGDLTAASFEAKDRGARTAILLDADNCVAEGPGFNVVM

VKDGKLSSPSRNALPGITRLTVMEMADEMGIEFTLRDITSRELYEADE

LIAVTTAGGITPITSLDGEPLGDGTPGPVTVAIRDRFWAMMDEPSSLV

EAIEY.

The ω-transaminase mutant L107I derived from *Actinobacteria* sp. is used as a template, 17 pairs of saturated mutation primers (F133, L166, A295, A168, V80, T293, W167, G235, W203, F236, T294, K149, H73, Y78, K146, V194, and R145) are designed, a saturation mutation means is used, and pET22b(+) is used as an expression vector, to obtain a mutant plasmid.

The saturation mutation is a method to obtain a mutant in which an amino acid of a target site is respectively substituted by other 19 amino acids in a short period of time by modifying a coding gene of a target protein. This method is not only a powerful tool for protein-directed modification, but also an important means for researches of protein structure-function relationships. The saturation mutation may often obtain a more ideal evolutionary body than a single point mutation. For these problems that the site-directed mutagenesis method may not solve, it is precisely the uniqueness that the saturation mutation method is good at.

On the basis of the mutant with the improved activity obtained by the saturation mutation, beneficial amino acid sites may be combined, to obtain a mutant with the better characters. A construction method of a double point mutation in a combined mutation is the same as a construction method of the single point mutation, and a whole plasmid PCR method is used to construct. At the same time, the multipoint mutation of 2 or more sites is performed by overlap extension PCR amplification, to obtain a mutant gene containing the multipoint mutation. After two terminals are enzyme-digested with a restriction endonuclease, it is linked to an expression vector, transformed into *Escherichia coli*, spread on a Luria-Bertani (LB) culture dish containing 100 μg/mL ampicillin, and cultured at 37° C. overnight, to obtain a combined mutant. The mutant is sequenced and identified.

The mutant plasmid obtained by the saturation mutation and the combined mutation is transformed into the *Escherichia coli*, and expressed in the *Escherichia coli*. Then crude enzyme solution is obtained by a method of ultrasonically disrupting cells. Optimal conditions for transaminase-induced expression: overnight induction with 0.2 mM isopropyl-o-d-thiogalactoside (IPTG) at 25° C.

After the transaminase mutant with the greatly improved activity is obtained, a random mutation is performed by using an error-prone PCR method. A mutant with the further improved activity is obtained by constructing a high-quality mutant library, developing a suitable high-throughput screening method, and screening the library.

Error-prone PCR: means PCR under error-prone conditions, namely a PCR technology that easily makes a mistake in a copied DNA sequence, also known as a mismatch PCR or an error-tendency PCR. Specifically, it is a method for inducing a DNA sequence variation in vitro that by using a low-fidelity TaqDNA polymerase and changing the PCR reaction conditions, which induce the fidelity of a DNA replication and increase a base mismatch during the synthesis process of a new DNA strand, thereby it is caused that more point mutations occur in an amplified product.

The error-prone PCR is the simplest and most effective gene in vitro random mutagenesis technology at present Its principle is as follows: the isomerism of bases provides the possibility for mismatches, and four bases that form DNA all have tautomers. The bases such as guanine (G), cytosine (C) and thymine (T) are 3 oxygen-containing bases which have ketone-type and enol-type two tautomers. Adenine (A) and thymine are two kinds of nitrogen-containing bases which have amine-type and imine-type two tautomers. G, C and T mainly exist as a ketone structure, the ratio of an enol-type structure is extremely low. Nitrogen atoms on two nitrogen-containing bases A and T mainly exist as an amino group ($NH_2$) state, and ratio of existence as an imine group (NH) state is extremely low. The difference in positions of hydrogen atoms between different isomers and the difference in deviation directions of an electron cloud in the same position may change a pairing form of the bases, so that the mismatches may occur in a replicated sub-chain. For example, while the thymine exists as the ketone-type structure, it is paired with the adenine. While it exists as the enol-type structure, it is paired with the guanine. In this way, an unstable base pair that A may be paired with C, and T may be paired with G occurs, thereby the mismatch is caused.

In several known thermostable DNA polymerases, the mismatch rate of a Taq DNA polymerase is the highest. The Taq DNA polymerase is the most active one of the thermostable DNA polymerases found. It has 5'-3' exonuclease activity, and does not have 3'-5' exonuclease activity. Therefore, there is no correction function for some mononucleotide mismatches in the synthesis, so the probability of the mismatches is higher than that of the DNA polymerase with 3'-5' correction activity. The fidelity of the DNA polymerase may be reduced by a plurality of methods, including using 4 different concentrations of dNTPs, adding $Mn^{2+}$, increasing the $Mg^{2+}$ concentration and the like. Mechanisms by which several mutagenesis methods lead to base changes in an amplified DNA strand are different. $MnCl_2$ is a mutagenic factor of the DNA polymerase. The addition of $Mn^{2+}$ may reduce the specificity of the polymerase to the template, and increase the mismatch rate. The unbalanced concentration of the 4 dNTPs may increase the probability of base misincorporation, and achieve the mismatch. $Mg^{2+}$ has the effect of activating a Taq enzyme, and a non-complementary base pair may be stabilized by increasing the concentration of $Mg^{2+}$ to the excessive amount. The improved amount of the Taq DNA polymerase and the increased extension time of each cycle may increase the probability of mismatch terminal extension. And the reduced initial template concentration may increase the proportion of a variant template in a subsequent PCR cycle.

Therefore, on the basis of the above research results, the applicant proposes the technical scheme of the present application. In a typical embodiment of the present application, a transaminase mutant is provided. Compared with an amino acid sequence shown in SEQ ID NO:1, the amino acid sequence of the transaminase mutant comprises at least one of the mutated sites selected from the group consisting of: L166, K149, K146, A168, H73, F133, H82, E24, V194, T294, A295, G235 and F236. The mutant of the present invention has the improved catalytic activity for the transamination reaction of ketone substrates, and is suitable for industrial production of chiral amines.

In a preferred embodiment, the amino acid sequence of the transaminase mutant further comprises one of the mutated sites selected from the group consisting of: L166I/V, K149V/C/I/W/M/Y/H/L/F/R, K146R/M/A/P, A168M/V/I/S/P/F, H73T/N/C/Q/R/W/M/K/S, F133S/Q/M/R/A/D, H82S\Q\E\T\Y, E24V/S/A/F, V194I/S/A/H/N, T294Q/W/V/A/E/R/Y/F, A295S/Y/I/M/G, G235Y/H and F236I/T/P/M/V/D/S, Y9N, S132K, R145K/P/S/M/Y, L151R/M/A, and T178M, "/" represents "or"; or the transaminase mutant comprises the one or more of above mutated sites, and the acid sequence of the transaminase mutant has more than 80%, preferably more than 90%, further more preferably more than 95% of the identity with the transaminase mutant with the one or more of mutated sites. The above transaminase mutant may further improve the catalytic activity of the transamination reaction.

In a more preferred embodiment, the amino acid sequence of the transaminase mutant comprises one of the following mutation combinations as shown in the preceding table.

In a second typical embodiment of the present application, a DNA molecule is provided, and the DNA molecule encodes any one of the above transaminase mutants. The above transaminase mutant encoded by the DNA molecule has the good transamination catalytic activity for the ketone substrates.

The above DNA molecule of the present invention may also exist in the form of an "expression cassette". The "expression cassette" refers to a linear or cyclic nucleic acid molecule, and encompasses DNA and ribonucleic acid (RNA) sequences which could direct the expression of a specific nucleotide sequence in an appropriate host cell. In general, a promoter operably linked to a target nucleotide is comprised, and it is optionally operably linked with a termination signal and/or other regulatory elements. The expression cassette may also comprises a sequence required for correct translation of the nucleotide sequence. A coding area usually encodes a target protein, but also encodes a target functional RNA such as antisense RNA or untranslated RNA in either sense or antisense direction, for example. The expression cassette containing the target polynucleotide sequence may be chimeric, and it means that at least one of its components is heterologous to at least one of its other components. The expression cassette may also be naturally-existing, but obtained by efficient recombinant formation for heterologous expression.

In a third typical embodiment of the present application, a recombinant plasmid is provided, and the recombinant plasmid contains any one of the above DNA molecules. The DNA molecule in the above recombinant plasmid is placed in an appropriate position of the recombinant plasmid, so that the above DNA molecule may be correctly and smoothly replicated, transcribed or expressed.

Although a term "contain" is used in the present invention to define the above DNA molecule, it does not mean that other sequences irrelevant to its function may be arbitrarily added to both terminals of the DNA sequence. It is known by those skilled in the art that, in order to meet the requirements of a recombination operation, it is necessary to add suitable enzyme cleavage sites of a restriction endonuclease at both terminals of the DNA sequence, or additionally add a promoter codon, a stop codon and the like. Therefore, if a closed-form statement is used to define, these situations may not be truly covered.

A term "plasmid" as used in the present invention includes any plasmid, cosmid, bacteriophage or agrobacterium binary nucleic acid molecule in double-stranded or single-stranded linear or cyclic form, preferably a recombinant expression plasmid, either a prokaryotic expression plasmid or a eukaryotic expression plasmid, but preferably the prokaryotic expression plasmid. In some embodiments, the recombinant plasmid is selected from pET-22a(+), pET-22b(+), pET-3a(+), pET-3d(+), pET-11a(+), pET-12a(+), pET-14b(+), pET-15b(+), pET-16b(+), pET-17b(+), pET-19b (+), pET-20b(+), pET-21a(+), pET-23a(+), pET-23b(+), pET-24a (+), pET-25b(+), pET-26b(+), pET-27b(+), pET-28a(+), pET-29a(+), pET-30a(+), pET-31b(+), pET-32a(+), pET-35b(+), pET-38b(+), pET-39b(+), pET-40b(+), pET-41a (+), pET-41b(+), pET-42a(+), pET-43a(+), pET-43b(+), pET-44a(+), pET-49b(+), pQE2, pQE9, pQE30, pQE31, pQE32, pQE40, pQE70, pQE80, pRSET-A, pRSET-B, pRSET-C, pGEX-5X-1, pGEX-6p-1, pGEX-6p-2, pBV220, pBV221, pBV222, pTrc99A, pTwin1, pEZZ18, pKK232-18, pUC-18 or pUC-19. More preferably, the above recombinant plasmid is pET-22b(+).

In a fourth typical embodiment of the present application, a host cell is provided, and the host cell contains any one of the above recombinant plasmids. The host cell suitable for the present invention comprises but not limited to a prokaryotic cell, yeast or a eukaryotic cell. Preferably the prokaryotic cell is eubacteria, for example gram-negative bacteria or gram-positive bacteria. More preferably, the prokaryotic cell is an *Escherichia coli* BL21 cell or an *Escherichia coli* DH5a competent cell.

In a fifth typical embodiment of the present application, a method for producing a chiral amine is provided, the method comprises: using any one of the above transaminase mutants to catalyze a transamination reaction of a ketone compound of

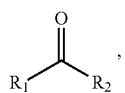

to produce a product of

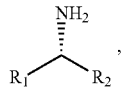

herein each of $R_1$ and $R_2$ are independently a substituted or unsubstituted alkyl, a substituted or unsubstituted aralkyl, or a substituted or unsubstituted aryl respectively, and $R_1$ and $R_2$ form an unsubstituted or substituted ring independently or in combination with each other.

In a preferred embodiment, $R_1$ and $R_2$ are the optionally substituted or unsubstituted alkyl, the optionally substituted or unsubstituted aralkyl, or the optionally substituted or unsubstituted aryl of which the number of carbon atoms is 1-20(C1-C20); preferably, $R_1$ and $R_2$ are the optionally substituted or unsubstituted alkyl, the optionally substituted or unsubstituted aralkyl, or the optionally substituted or unsubstituted alkyl of which the number of the carbon atoms is 1-10; and preferably, the substitution means that it is substituted by a halogen atom, the nitrogen atom, the sulfur atom, a hydroxyl, a nitro group, a cyano group, a methoxy, an ethoxy, a carboxyl, a carboxymethyl, a carboxyethyl or a methylenedioxy.

In a more preferred embodiment, the ketone compound is

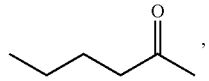

or the ketone compound is an acetophenone compound substituted or unsubstituted at any position of the benzene ring, and the transaminase mutant catalyzes the transamination reaction of

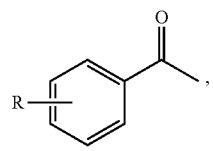

to proform the product

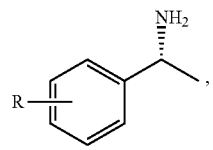

herein R represents any substitutation of a halogen atom, the nitro group, the methyl or the methoxyl at any position of the benzene ring; preferably, the halogen is a fluorine atom; more preferably, the fluorine atom is substituted in a meta position of the benzene ring; preferably, the nitro group is substituted in an ortho position of the benzene ring.

In a more preferred embodiment, the acetophenone compound is

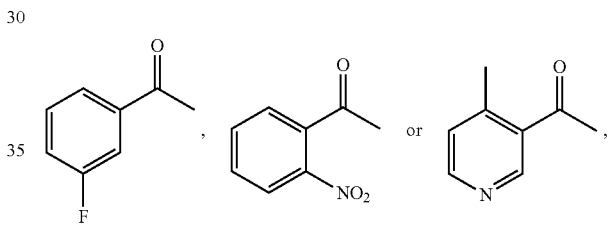

and the transaminase mutant of the present application has the highest catalytic activity for the above acetophenone compounds.

The beneficial effects of the present application are further described below with reference to specific embodiments.

Raw materials mentioned in the following embodiments are as follows:

Raw material 1

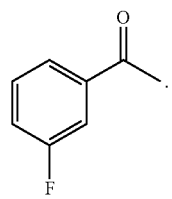

3'-Fluoroacetophenone: CasNO:455-36-7

Raw material 2

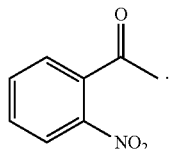

2'-Nitroacetophenone CasNO:577-59-3

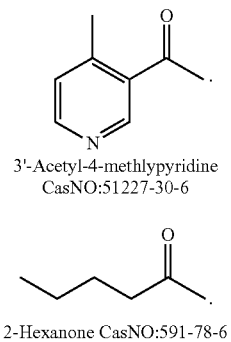

Raw material 3

3'-Acetyl-4-methlypyridine
CasNO:51227-30-6

Raw material 4

2-Hexanone CasNO:591-78-6

Embodiment 1

30 mg of the raw material 1, the raw material 2, the raw material 3 and the raw material 4 are respectively added to a 5 mL reaction flask, Tris-Cl (0.1M) at pH 8.5, 181 μL of an isopropylamine hydrochloride (6 M), 0.9 mg of a pyridoxal phosphate (PLP), and 300 mg of a transaminase (see Table 1 for details) are added, and mixed uniformly, the total volume is 1500 μL, and it is reacted at 30° C. and in a 200 rpm shaker for 16 h. After the reaction, the 2-fold volume of methanol is added to a reaction system, and mixed uniformly. It is centrifuged at 12000 rpm for 3 min, a supernatant is taken, and detected by a high performance liquid chromatography (HPLC) with a wavelength of 210 nm. Some of the mutant reaction characteristics are as follows:

TABLE 1

| | Activity | | | |
|---|---|---|---|---|
| Mutant | Raw material 1 | Raw material 2 | Raw material 3 | Raw material 4 |
| Female parent | − | − | − | − |
| L166I | + | + | + | + |
| L166V | + | + | + | + |
| K149Q | + | + | + | + |
| K149V | + | + | + | + |
| K149C | + | + | + | + |
| K149I | + | + | + | + |
| K149W | + | + | + | + |
| K146R | + | + | + | + |
| K146M | + | + | + | + |
| K146A | + | + | + | + |
| A168M | + | + | + | + |
| A168V | + | + | + | + |
| A168I | + | + | + | + |
| H73T | + | + | + | + |
| H73N | + | + | + | + |
| H73C | + | + | + | + |
| H73Q | + | + | + | + |
| F133S | + | + | + | + |
| F133Q | + | + | + | + |
| F133M | + | + | + | + |

In the above table, the female parent is mutant SEQ ID NO:1; the level of an enzyme to the substrate conversion rate is represented by the activity, − represents the initial activity of the female parent, the multiple of the increased activity is represented by +, + represents an increase of 1-5 times, and ++ represents an increase of 5-10 times.

It may be seen from results in Table 1 that the transformation effect of a single-point mutant is improved compared with the female parent, but it does not achieve the optimal effect. The combination of beneficial mutation sites may further improve the mutant activity.

Embodiment 2

30 mg of the raw material 1, the raw material 2, the raw material 3 and the raw material 4 are respectively added to a 5 mL reaction flask, Tris-Cl (0.1 M) at pH 8.5, 181 μL of an isopropylamine hydrochloride (6 M), 0.9 mg of PLP, and 210 mg of a transaminase (see Table 2 for details) are added, and mixed uniformly, the total volume is 1500 μL, and it is reacted at 30° C. and in a 200 rpm shaker for 16 h. After the reaction, the 2-fold volume of methanol is added to a reaction system, and mixed uniformly. It is centrifuged at 12000 rpm for 3 min, a supernatant is taken, and detected by HPLC with a wavelength of 210 nm. Some of the mutant reaction characteristics are as follows:

TABLE 2

| | Activity | | | |
|---|---|---|---|---|
| Mutant | Raw material 1 | Raw material 2 | Raw material 3 | Raw material 4 |
| Female parent | − | − | − | − |
| L166I + A168I | ++ | ++ | + | ++ |
| L166I + A168V | + | + | + | ++ |
| L166I + A168M | ++ | + | ++ | + |
| L166I + K149V | + | + | + | ++ |
| L166I + K149C | ++ | ++ | + | ++ |
| L166V + A168M | + | + | ++ | ++ |
| L166V + A168I | + | ++ | + | + |
| L166V + A168V | + | + | ++ | + |
| L166V + K149V | ++ | + | ++ | ++ |
| L166V + K149C | + | ++ | ++ | ++ |
| L166I + F133S + K149Q | ++ | ++ | ++ | ++ |
| L166I + F133S | + | + | ++ | + |
| L166I + K146R | ++ | + | ++ | ++ |
| L166I + K146M | + | + | + | ++ |
| L166I + K146A | ++ | ++ | + | + |

The above female parent is mutant SEQ ID NO:1; the level of an enzyme to the substrate conversion rate is represented by the activity, − represents the initial activity of the female parent, the multiple of the increased activity is represented by +, + represents an increase of 1-5 times, and ++ represents an increase of 5-10 times.

It may be seen from results in Table 2 that the activity of the mutant is further improved, but the optimal effect is not yet achieved. By an evolution method of an iterative saturation mutation, the mutant sites with the increased activity may be superimposed, as to avoid that an evolution result is limited to the local highest point and may not reach the global highest point during the evolution process, and the mutant with the increased activity is obtained.

Embodiment 3

30 mg of the raw material 1, the raw material 2, the raw material 3 and the raw material 4 are respectively added to a 5 mL reaction flask, Tris-Cl (0.1 M) at pH 8.5, 181 μL of an isopropylamine hydrochloride (6 M), 0.9 mg of PLP, and 60 mg of a transaminase (see Table 3 for details) are added, and mixed uniformly, the total volume is 900 μL, and it is reacted at 30° C. and in a 200 rpm shaker for 16 h. After the reaction, the 2-fold volume of methanol is added to a reaction system, and mixed uniformly. It is centrifuged at 12000 rpm for 3 min, a supernatant is taken, and detected by HPLC with a wavelength of 210 nm. Some of the mutant reaction characteristics are as follows:

TABLE 3

| Mutant | Activity | | | |
|---|---|---|---|---|
| | Raw material 1 | Raw material 2 | Raw material 3 | Raw material 4 |
| Female parent | − | − | − | − |
| L166I + K146R + A168I | ++ | +++ | +++ | ++++ |
| L166I + K146R + A168S | +++ | ++ | ++ | ++++ |
| L166I + K146R + A168P | +++ | +++ | ++ | ++++ |
| L166I + K146R + A168F | +++ | ++ | +++ | ++ |
| L166I + A168I + K149H | +++ | ++ | +++ | ++ |
| L166I + A168I + K149Y | +++ | ++ | +++ | ++ |
| L166I + A168I + H73N | +++ | ++ | +++ | ++ |
| L166I + A168I + K149H + R145K | ++++ | ++++ | ++++ | +++ |
| L166I + A168I + K149H + K146P | +++ | +++ | ++++ | ++++ |
| L166I + A168I + K149Y + H73N | ++++ | ++++ | ++++ | +++ |
| L166I + K146R + A168I + K149H | +++ | +++ | ++++ | ++ |
| L166I + K146R + A168I + K149L | ++++ | +++ | +++ | ++++ |
| L166I + K146R + A168I + K149I | +++ | ++++ | ++++ | +++ |
| L166I + K146R + A168I + K149V | +++ | +++ | ++++ | ++++ |
| L166I + K146R + A168I + K149F | ++ | +++ | +++ | ++++ |
| L166I + K146R + A168I + K149M | +++ | ++ | ++++ | +++ |
| L166I + K146R + A168I + K149Y | ++++ | ++++ | +++ | +++ |
| L166I + K146R + A168I + H73T | ++ | +++ | +++ | ++++ |
| L166I + K146R + A168I + H73S | +++ | +++ | ++++ | +++ |
| L166I + K146R + A168I + H73N | +++ | +++ | ++ | ++++ |
| L166I + K146R + A168I + H73M | +++ | +++ | ++++ | +++ |
| L166I + K146R + A168I + H73Q | ++++ | +++ | +++ | ++++ |
| L166I + K146R + A168I + K149H | ++++ | +++ | +++ | ++ |
| L166I + K146R + A168I + K149H + R145K | ++++ | ++++ | +++ | +++ |
| L166I + K146R + A168I + K149H + R145S | +++ | +++ | ++++ | ++ |
| L166I + K146R + A168I + K149H + R145M | +++ | +++ | ++ | +++ |
| L166I + K146R + A168I + K149H + R145P | +++ | +++ | ++++ | ++++ |
| L166I + K146R + A168I + K149H + R145Y | ++++ | +++ | +++ | ++++ |
| L166I + K146R + A168I + K149H + R145K + T294A | ++++ | +++ | +++ | +++ |
| L166I + K146R + A168I + K149H + R145K + T294E | ++++ | ++++ | ++++ | +++ |
| L166I + K146R + A168I + K149H + R145K + T294R | ++ | +++ | ++++ | ++++ |
| L166I + K146R + A168I + K149H + R145K + T294Y | +++ | ++ | +++ | ++++ |
| L166I + K146R + A168I + K149H + R145K + T294F | ++ | ++ | ++++ | +++ |

The above female parent is mutant SEQ ID NO:1; the level of an enzyme to the substrate conversion rate is represented by the activity, − represents the initial activity of the female parent, the multiple of the increased activity is represented by +, + represents an increase of 1-5 times, ++ represents an increase of 5-10 times, +++ represents an increase of 10-20 times, and ++++ represents an increase of 20-30 times.

Embodiment 4

30 mg of the raw material 1, the raw material 2, the raw material 3 and the raw material 4 are respectively added to a 5 mL reaction flask, Tris-Cl (0.1 M) at pH 8.5, 181 μL of an isopropylamine hydrochloride (6 M), 0.9 mg of PLP, and 60 mg of a transaminase (see Table 4 for details) are added, and mixed uniformly, the total volume is 900 μL, and it is reacted at 30° C. and in a 200 rpm shaker for 16 h. After the reaction, the 2-fold volume of methanol is added to a reaction system, and mixed uniformly. It is centrifuged at 12000 rpm for 3 min, a supernatant is taken, and detected by HPLC with a wavelength of 210 nm. Some of the mutant reaction characteristics are as follows:

TABLE 4

| Mutant | Activity | | | |
|---|---|---|---|---|
| | Raw material 1 | Raw material 2 | Raw material 3 | Raw material 4 |
| Female parent | − | − | − | − |
| L166I + K146R + F133S | +++ | ++ | +++ | ++ |
| L166I + K146R + F133R | ++ | ++ | ++ | +++ |
| L166I + K146R + F133A | ++ | +++ | ++ | ++ |
| L166I + K146R + F133M | ++ | ++ | +++ | +++ |
| L166I + K146R + F133Q | ++ | +++ | +++ | +++ |
| L166I + K146R + F133D | +++ | ++ | +++ | ++ |
| L166I + K146R + F133S + K149Q | ++++ | ++++ | ++++ | +++ |
| L166I + K146R + F133S + K149R | ++ | ++ | +++ | +++ |
| L166I + K146R + F133S + K149L | ++ | ++ | ++ | ++ |
| L166I + K146R + F133S + K149M | ++ | ++ | ++ | ++ |
| L166I + K146R + F133S + K149Y | +++ | ++ | +++ | ++ |
| L166I + K146R + F133S + K149Q + H73R | ++++ | ++++ | +++ | ++++ |
| L166I + K146R + F133S + K149Q + H73Q | ++++ | ++ | ++++ | ++ |

TABLE 4-continued

| Mutant | Activity | | | |
|---|---|---|---|---|
| | Raw material 1 | Raw material 2 | Raw material 3 | Raw material 4 |
| L166I + K146R + F133S + K149Q + H73K | +++ | +++ | +++ | +++ |
| L166I + K146R + F133S + K149Q + H73T | +++ | +++ | +++ | +++ |
| L166I + K146R + F133S + K149Q + H73S | ++ | +++ | +++ | ++++ |
| L166I + K146R + F133S + K149Q + H73W | +++ | ++ | ++ | +++ |
| L166I + K146R + F133S + K149Q + H73R + V194I | ++ | ++ | +++ | +++ |
| L166I + K146R + F133S + K149Q + H73R + V194S | ++++ | ++++ | ++++ | +++++ |
| L166I + K146R + F133S + K149Q + H73R + V194A | ++ | ++ | +++ | ++ |
| L166I + K146R + F133S + K149Q + H73R + V194H | +++ | +++ | +++ | +++ |
| L166I + K146R + F133S + K149Q + H73R + V194N | +++ | +++ | +++ | +++ |
| L166I + K146R + F133S + K149Q + H73R + V194I + H82S | +++++ | +++++ | +++++ | +++++ |
| L166I + K146R + F133S + K149Q + H73R + V194I + H82Q | +++ | ++ | +++ | ++ |
| L166I + K146R + F133S + K149Q + H73R + V194I + H82E | +++ | ++++ | +++ | ++++ |
| L166I + K146R + F133S + K149Q + H73R + V194I + H82T | +++ | ++ | +++ | ++ |
| L166I + K146R + F133S + K149Q + H73R + V194I + H82Y | +++ | ++ | +++ | ++ |
| L166I + K146R + F133S + K149Q + H73R + V194I + E24V | +++++ | +++++ | +++++ | +++++ |
| L166I + K146R + F133S + K149Q + H73R + V194I + E24S | +++ | ++ | ++++ | +++ |
| L166I + K146R + F133S + K149Q + H73R + V194I + E24A | +++ | ++ | ++++ | +++ |
| L166I + K146R + F133S + K149Q + H73R + V194I + E24F | +++ | ++ | ++++ | ++ |
| L166I + K146R + F133S + K149Q + H73R + V194I + L151R | +++++ | +++++ | +++++ | +++++ |
| L166I + K146R + F133S + K149Q + H73R + V194I + L151M | +++ | ++++ | +++ | ++++ |
| L166I + K146R + F133S + K149Q + H73R + V194I + L151A | +++ | +++ | ++++ | ++++ |
| L166I + K146R + F133S + K149Q + H73R + V194I + E24V + A295S | +++ | ++ | +++ | +++ |
| L166I + K146R + F133S + K149Q + H73R + V194I + E24V + A295Y | ++++ | ++++ | ++++ | ++++ |
| L166I + K146R + F133S + K149Q + H73R + V194I + E24V + A295I | ++++ | ++ | ++++ | +++ |
| L166I + K146R + F133S + K149Q + H73R + V194I + E24V + A295M | +++ | +++ | +++ | +++ |
| L166I + K146R + F133S + K149Q + H73R + V194I + E24V + A295G | +++ | ++++ | +++ | ++++ |
| L166I + K146R + F133S + K149Q + H73R + V194I + E24V + T294A | +++ | ++ | +++ | +++ |
| L166I + K146R + F133S + K149Q + H73R + V194I + E24V + T294R | +++ | ++ | ++++ | +++ |
| L166I + K146R + F133S + K149Q + H73R + V194I + E24V + T294Q | +++++ | +++++ | +++++ | +++++ |
| L166I + K146R + F133S + K149Q + H73R + V194I + E24V + T294W | +++ | ++++ | +++ | ++++ |
| L166I + K146R + F133S + K149Q + H73R + V194I + E24V + T294V | +++ | +++ | +++ | +++ |
| L166I + K146R + F133S + K149Q + H73R + V194I + E24V + G235Y | +++ | ++ | +++ | ++ |
| L166I + K146R + F133S + K149Q + H73R + V194I + E24V + G235H | +++ | ++++ | +++ | ++++ |
| L166I + K146R + F133S + K149Q + H73R + V194I + E24V + F236I | ++++ | ++++ | +++ | ++++ |
| L166I + K146R + F133S + K149Q + H73R + V194I + E24V + F236T | +++++ | +++ | ++++ | ++++ |
| L166I + K146R + F133S + K149Q + H73R + V194I + E24V + F236P | +++ | +++ | ++++ | ++++ |
| L166I + K146R + F133S + K149Q + H73R + V194I + E24V + F236M | ++++ | +++++ | +++ | ++++ |
| L166I + K146R + F133S + K149Q + H73R + V194I + E24V + F236V | ++++ | ++++ | ++++ | ++++ |
| L166I + K146R + F133S + K149Q + H73R + V194I + E24V + F236D | ++++ | ++++ | ++++ | +++++ |
| L166I + K146R + F133S + K149Q + H73R + V194I + E24V + F236S | ++++ | ++++ | ++++ | ++++ |

The above female parent is mutant SEQ ID NO:1; the level of an enzyme to the substrate conversion rate is represented by the activity, – represents the initial activity of the female parent, the multiple of the increased activity is represented by +, + represents an increase of 1-5 times, ++ represents an increase of 5-10 times, +++ represents an increase of 10-20 times, ++++ represents an increase of 20-30 times, +++++ represents an increase of 30-50 times, and ++++++ represents that an increase is greater than 50 times.

It may be seen from results in Table 4 that the use of an iterative saturation mutation greatly improves the activity of the mutant. In the next step, a random mutation (error-prone PCR) may be used to further improve the mutant activity, to obtain a final mutant that may be used for industrial production.

Embodiment 5

30 mg of the raw material 1, the raw material 2, the raw material 3 and the raw material 4 are respectively added to a 5 mL reaction flask, Tris-Cl (0.1 M) at pH 8.5, 181 μL of an isopropylamine hydrochloride (6 M), 0.9 mg of PLP, and 30 mg of a transaminase (see Table 5 for details) are added, and mixed uniformly, the total volume is 900 μL, and it is reacted at 30° C. and in a 200 rpm shaker for 16 h. After the reaction, the 2-fold volume of methanol is added to a reaction system, and mixed uniformly. It is centrifuged at 12000 rpm for 3 min, a supernatant is taken, and detected by HPLC with a wavelength of 210 nm. Some of the mutant reaction characteristics are as follows:

TABLE 5

| Mutant | Activity | | | |
|---|---|---|---|---|
| | Raw material 1 | Raw material 2 | Raw material 3 | Raw material 4 |
| Female parent | – | – | – | – |
| L166I + K146P + F133S + K149Q + H73R + V194I + H82S | ++++++ | ++++++ | +++++ | +++++ |
| L166I + K146R + F133S + K149Q + H73R + V194I + H82S + Y9N | ++++++ | ++++++ | +++++ | ++++++ |
| L166I + K146R + F133S + K149Q + H73R + V194I + H82S + E24V | ++++++ | ++++++ | +++++ | ++++++ |

TABLE 5-continued

| | Activity | | | |
|---|---|---|---|---|
| Mutant | Raw material 1 | Raw material 2 | Raw material 3 | Raw material 4 |
| L166I + K146R + F133S + K149Q + H73R + V194I + H82S + S132K | ++++ | +++++ | +++++ | +++++ |
| L166I + K146R + F133S + K149Q + H73R + V194I + H82S + T178M | +++++ | ++++++ | +++++ | ++++++ |
| L166I + K146R + F133S + K149Q + H73R + V194I + H82S + E24A | +++++ | ++++++ | +++++ | +++++ |

The above female parent is mutant SEQ ID NO:1; the level of an enzyme to the substrate conversion rate is represented by the activity, − represents the initial activity of the female parent, the multiple of the increased activity is represented by +, + represents an increase of 1-5 times, ++ represents an increase of 5-10 times, +++ represents an increase of 10-20 times, ++++ represents an increase of 20-30 times, +++++ represents an increase of 30-50 times, and ++++++ represents that an increase is greater than 50 times.

Embodiment 6

30 mg of the raw material 1, the raw material 2, the raw material 3 and the raw material 4 are respectively added to a 5 mL reaction flask, Tris-Cl (0.1 M) at pH 8.5, 181 μL of an isopropylamine hydrochloride (6 M), 0.9 mg of PLP, and 30 mg of a transaminase (see Table 6 for details) are added, and mixed uniformly, the total volume is 900 μL, and it is reacted at 30° C. and in a 200 rpm shaker for 16 h. After the reaction, 2 mL of an ethyl acetate is added to a reaction system, and mixed uniformly. It is centrifuged at 12000 rpm for 3 min, and extracted, a supernatant is taken, and an enantiomeric excess (ee) value is detected by HPLC. The mutant reaction characteristics are as follows:

TABLE 6

| | ee (%) | | | |
|---|---|---|---|---|
| Mutant | Raw material 1 | Raw material 2 | Raw material 3 | Raw material 4 |
| L166I + K146R + F133S | >99.5 | >99.5 | >99.5 | >99.5 |
| L166I + K146R + A168I + K149H | >99.5 | >99.5 | >99.5 | >99.5 |
| L166I + K146R + F133S + K149Q | >99.5 | >99.5 | >99.5 | >99.5 |
| L166I + K146R + F133S + K149Q + H73R | >99.5 | >99.5 | >99.5 | >99.5 |
| L166I + K146R + F133S + K149Q + H73Q | >99.5 | >99.5 | >99.5 | >99.5 |
| L166I + K146R + F133S + K149Q + H73K | >99.5 | >99.5 | >99.5 | >99.5 |
| L166I + K146R + F133S + K149Q + H73T | >99.5 | >99.5 | >99.5 | >99.5 |
| L166I + K146R + F133S + K149Q + H73R + V194I | >99.5 | >99.5 | >99.5 | >99.5 |
| L166I + K146R + F133S + K149Q + H73R + V194I + H82S | >99.5 | >99.5 | >99.5 | >99.5 |
| L166I + K146R + F133S + K149Q + H73R + V194I + L151R | >99.5 | >99.5 | >99.5 | >99.5 |
| L166I + K146R + F133S + K149Q + H73R + V194I + H82Q | >99.5 | >99.5 | >99.5 | >99.5 |
| L166I + K146R + F133S + K149Q + H73R + V194I + E24V | >99.5 | >99.5 | >99.5 | >99.5 |
| L166I + K146R + F133S + K149Q + H73R + V194I + H82S + E24V | >99.5 | >99.5 | >99.5 | >99.5 |

Embodiment 7

20 g of the raw material 1 and the raw material 2 are respectively added to a 2 L reaction flask, Tris-Cl (0.1 M) at pH 8.5, 120 mL of an isopropylamine hydrochloride (6 M), 0.6 g of PLP, and 20 g of a transaminase (see Table 7 for details) are added, and mixed uniformly, the total volume is 600 mL, and it is reacted at 30° C. and in a 200 rpm shaker for 16 h. After the reaction, 600 mL of an ethyl acetate is added to a reaction system, and mixed uniformly. It is centrifuged at 12000 rpm for 3 min, and extracted. A sample is post-treated, and detected by HPLC. The yield, purity and ee value are measured.

TABLE 7

| | Raw material 1 | | | Raw material 2 | | |
|---|---|---|---|---|---|---|
| Mutant | Yield (%) | Purity (%) | ee (%) | Yield (%) | Purity (%) | ee (%) |
| L166I + K146R + F133S | >70 | >99 | >99.5 | >70 | >99 | >99.5 |
| L166I + K146R + A168I + K149H | >80 | >99 | >99.5 | >80 | >99 | >99.5 |
| L166I + K146R + F133S + K149Q | >70 | >99 | >99.5 | >70 | >99 | >99.5 |
| L166I + K146R + F133S + K149Q + | >70 | >99 | >99.5 | >70 | >99 | >99.5 |

TABLE 7-continued

| Mutant | Raw material 1 | | | Raw material 2 | | |
|---|---|---|---|---|---|---|
| | Yield (%) | Purity (%) | ee (%) | Yield (%) | Purity (%) | ee (%) |
| H73R | | | | | | |
| L166I + K146R + F133S + K149Q + H73Q | >70 | >99 | >99.5 | >70 | >99 | >99.5 |
| L166I + K146R + F133S + K149Q + H73K | >70 | >99 | >99.5 | >70 | >99 | >99.5 |
| L166I + K146R + F133S + K149Q + H73T | >70 | >99 | >99.5 | >70 | >99 | >99.5 |
| L166I + K146R + F133S + K149Q + H73R + V194I | >70 | >99 | >99.5 | >70 | >99 | >99.5 |
| L166I + K146R + F133S + K149Q + H73R + V194I + H82S | >90 | >99 | >99.5 | >90 | >99 | >99.5 |
| L166I + K146R + F133S + K149Q + H73R + V194I + L151R | >90 | >99 | >99.5 | >90 | >99 | >99.5 |
| L166I + K146R + F133S + K149Q + H73R + V194I + H82Q | >90 | >99 | >99.5 | >90 | >99 | >99.5 |
| L166I + K146R + F133S + K149Q + H73R + V194I + E24V | >90 | >99 | >99.5 | >90 | >99 | >99.5 |
| L166I + K146R + F133S + K149Q + H73R + V194I + H82S + E24V | >90 | >99 | >99.5 | >90 | >99 | >99.5 |

From the above descriptions, it may be seen that the above embodiments of the present invention achieve the following technical effects: the present application rationally modifies the proteins of the existing reductase mutants by a combined method of rational design and random mutation, and the obtained mutants are screened for the catalytic activity and stereoselectivity by using the substrate ketones of the present application, and mutant strains with the high selectivity and high activity are finally obtained, and the strains containing these mutants are applied to the catalytic reduction reaction of the ketone substrates of the present application, so the generation efficiency of the corresponding chiral alcohol compounds thereof may be improved.

The above are only preferred embodiments of the present invention, and are not intended to limit the present invention. For those skilled in the art, the present invention may have various modifications and changes. Any modifications, equivalent replacements, improvements and the like made within the spirit and principle of the present invention shall fall within the scope of protection of the present invention.

What is claimed is:

1. A transaminase mutant, wherein the transaminase mutant comprises: a protein having the amino acid sequence of SEQ ID NO: 1 with a mutation of one or more amino acids, wherein the mutation is selected from the group consisting of:

L166I+A168I, L166I+K146R+F133M,
L166I+A168V, L166I+K146R+F133Q,
L166I+A168M, L166I+K146R+F133D,
L166I+K149V, L166I+K149Y+A168I+H73N,
L166I+K149C, L166I+K146R+A168I+K149H,
L166I+K146R+A168I+K149L,
L166I+K146R+A168I+K149I,
L166I+K146R+A168I+K149V,
L166I+K146R+A168I+K149F,
L166I+K146R+A168I+K149M,
L166I+F133S+K149Q, L166I+K146R+A168I+K149Y,
L166I+F133S, L166I+K146R+A168I+H73T,
L166I+K146R, L166I+K146R+A168I+H73S,
L166I+K146M, L166I+K146R+A168I+H73N,
L166I+K146A, L166I+K146R+A168I+H73M,
L166I+K146R+A168I, L166I+K146R+A168I+H73Q,
L166I+K146R+A168S, L166I+K146R+A168I+K149H,
L166I+K146R+A168P, L166I+K146R+A168I+K149H+R145K,
L166I+K146R+A168F, L166I+K146R+A168I+K149H+R145S,
L166I+A168I+K149H, L166I+K146R+A168I+K149H+R145M,
L166I+A168I+K149Y, L166I+K146R+A168I+K149H+R145P
L166I+A168I+H73N, L166I+K146R+A168I+K149H+R145Y,
L166I+A168I+K149H+R145K, L166I+K146R+A168I+K149H+R145K+T294A,
L166I+A168I+K149H+K146P, L166I+K146R+A168I+K149H+R145K+T294E,
L166I+K146R+F133S, L166I+K146R+A168I+K149H+R145K+T294R,
L166I+K146R+F133R, L166I+K146R+A168I+K149H+R145K+T294Y,
L166I+K146R+F133A, L166I+K146R+A168I+K149H+R145K+T294F,
L166I+K146R+F133S+K149Q,
L166I+K146R+F133S+K149R,
L166I+K146R+F133S+K149L,
L166I+K146R+F133S+K149M,
L166I+K146R+F133S+K149Y,
L166I+K146R+F133S+K149Q+H73R,
L166I+K146R+F133S+K149Q+H73Q,
L166I+K146R+F133S+K149Q+H73K,
L166I+K146R+F133S+K149Q+H73T,
L166I+K146R+F133S+K149Q+H73S,
L166I+K146R+F133S+K149Q+H73W,
L166I+K146R+F133S+K149Q+H73R+V194I,
L166I+K146R+F133S+K149Q+H73R+V194S,
L166I+K146R+F133S+K149Q+H73R+V194A,
L166I+K146R+F133S+K149Q+H73R+V194H,
L166I+K146R+F133S+K149Q+H73R+V194N,
L166I+K146R+F133S+K149Q+H73R+V194I+H82S,
L166I+K146R+F133S+K149Q+H73R+V194I+H82Q,
L166I+K146R+F133S+K149Q+H73R+V194I+H82E,

L166I+K146R+F133S+K149Q+H73R+V194I+H82T,
L166I+K146R+F133S+K149Q+H73R+V194I+H82Y,
L166I+K146R+F133S+K149Q+H73R+V194I+E24V,
L166I+K146R+F133S+K149Q+H73R+V194I+E24S,
L166I+K146R+F133S+K149Q+H73R+V194I+E24A,
L166I+K146R+F133S+K149Q+H73R+V194I+E24F,
L166I+K146R+F133S+K149Q+H73R+V194I+L151R,
L166I+K146R+F133S+K149Q+H73R+V194I+L151M,
L166I+K146R+F133S+K149Q+H73R+V194I+L151A,
L166I+K146R+F133S+K149Q+H73R+V194I+E24V+ A295S,
L166I+K146R+F133S+K149Q+H73R+V194I+E24V+ A295Y,
L166I+K146R+F133S+K149Q+H73R+V194I+E24V+ A295I,
L166I+K146R+F133S+K149Q+H73R+V194I+E24V+ A295M,
L166I+K146R+F133S+K149Q+H73R+V194I+E24V+ A295G,
L166I+K146R+F133S+K149Q+H73R+V194I+E24V+ T294A,
L166I+K146R+F133S+K149Q+H73R+V194I+E24V+ T294R,
L166I+K146R+F133S+K149Q+H73R+V194I+E24V+ T294Q,
L166I+K146R+F133S+K149Q+H73R+V194I+E24V+ T294W,
L166I+K146R+F133S+K149Q+H73R+V194I+E24V+ T294V,
L166I+K146R+F133S+K149Q+H73R+V194I+E24V+ G235Y,
L166I+K146R+F133S+K149Q+H73R+V194I+E24V+ G235H,
L166I+K146R+F133S+K149Q+H73R+V194I+E24V+ F236I,
L166I+K146R+F133S+K149Q+H73R+V194I+E24V+ F236T,
L166I+K146R+F133S+K149Q+H73R+V194I+E24V+ F236P,
L166I+K146R+F133S+K149Q+H73R+V194I+E24V+ F236M,
L166I+K146R+F133S+K149Q+H73R+V194I+E24V+ F236V,
L166I+K146R+F133S+K149Q+H73R+V194I+E24V+ F236D,
L166I+K146R+F133S+K149Q+H73R+V194I+E24V+ F236S,
L166I+K146P+F133S+K149Q+H73R+V194I+H82S,
L166I+K146R+F133S+K149Q+H73R+V194I+H82S+ Y9N,
L166I+K146R+F133S+K149Q+H73R+V194I+H82S+ E24V,
L166I+K146R+F133S+K149Q+H73R+V194I+H82S+ S132K,
L166I+K146R+F133S+K149Q+H73R+V194I+H82S+ T178M,
L166I+K146R+F133S+K149Q+H73R+V194I+H82S+ E24A, and
L166I+K146R+F133S+K149Q+H73R+V194I+H82S+ E24V.

2. A DNA molecule, wherein the DNA molecule encodes the transaminase mutant according to claim 1.

3. A recombinant plasmid, wherein the DNA molecule according to claim 2 is linked to the recombinant plasmid.

4. A host cell, wherein the host cell comprises the recombinant plasmid according to claim 3.

5. The host cell according to claim 4, wherein the host cell is a prokaryotic cell or a eukaryotic cell.

6. The host cell according to claim 5, wherein the prokaryotic cell is *Escherichia coli*.

* * * * *